United States Patent [19]

Nagasawa et al.

[11] 4,421,650
[45] Dec. 20, 1983

[54] PROCESS FOR SEPARATION OF CARBOHYDRATES

[75] Inventors: Kinzo Nagasawa, Tokyo; Akira Ogamo, Yokohama, both of Japan

[73] Assignee: Seikagaku Kogyo Co., Ltd., Tokyo, Japan

[21] Appl. No.: 461,059

[22] Filed: Jan. 26, 1983

Related U.S. Application Data

[63] Continuation of Ser. No. 292,679, Aug. 13, 1981, abandoned.

[30] Foreign Application Priority Data

Aug. 22, 1980 [JP] Japan .................. 55-114688

[51] Int. Cl.³ ............................. B01D 15/08
[52] U.S. Cl. ........................ 210/635; 127/34
[58] Field of Search .......... 210/635, 656; 127/24, 127/46.1, 46.3, 34

[56] References Cited

U.S. PATENT DOCUMENTS 3,960,720 6/1976 Porath et al. ............ 210/635 X
4,076,930 2/1978 Ellingboe et al. .......... 210/635 X
4,101,338 7/1978 Rapaport et al. .......... 127/46.3
4,104,078 8/1978 Barker et al. ............. 210/656

Primary Examiner—John Adee
Attorney, Agent, or Firm—Frishauf, Holtz, Goodman & Woodward

[57] ABSTRACT

There is provided a process for the separation of carbohydrates by use of hydrophobic interaction chromatography.

The process according to the present invention can accomplish effective separation of carbohydrates, particularly mucopolysaccharides including heparin, heparan sulfate, chondroitin sulfates, dermatan sulfate, hyaluronic acid, keratan sulfate and chondroitin-polysulfates. As the hydrophobic ligand in the chromatographic support to be used in the present invention, there may particularly be mentioned and alkyl group; an alkyl group substituted with a hydroxyl group, a carboxyl group and/or an amino group; an aryl group; or an aralkyl group. The chromatographic support is selected from cross-linked and non-cross-linked agaroses and polyvinyl alcohols.

12 Claims, 1 Drawing Figure

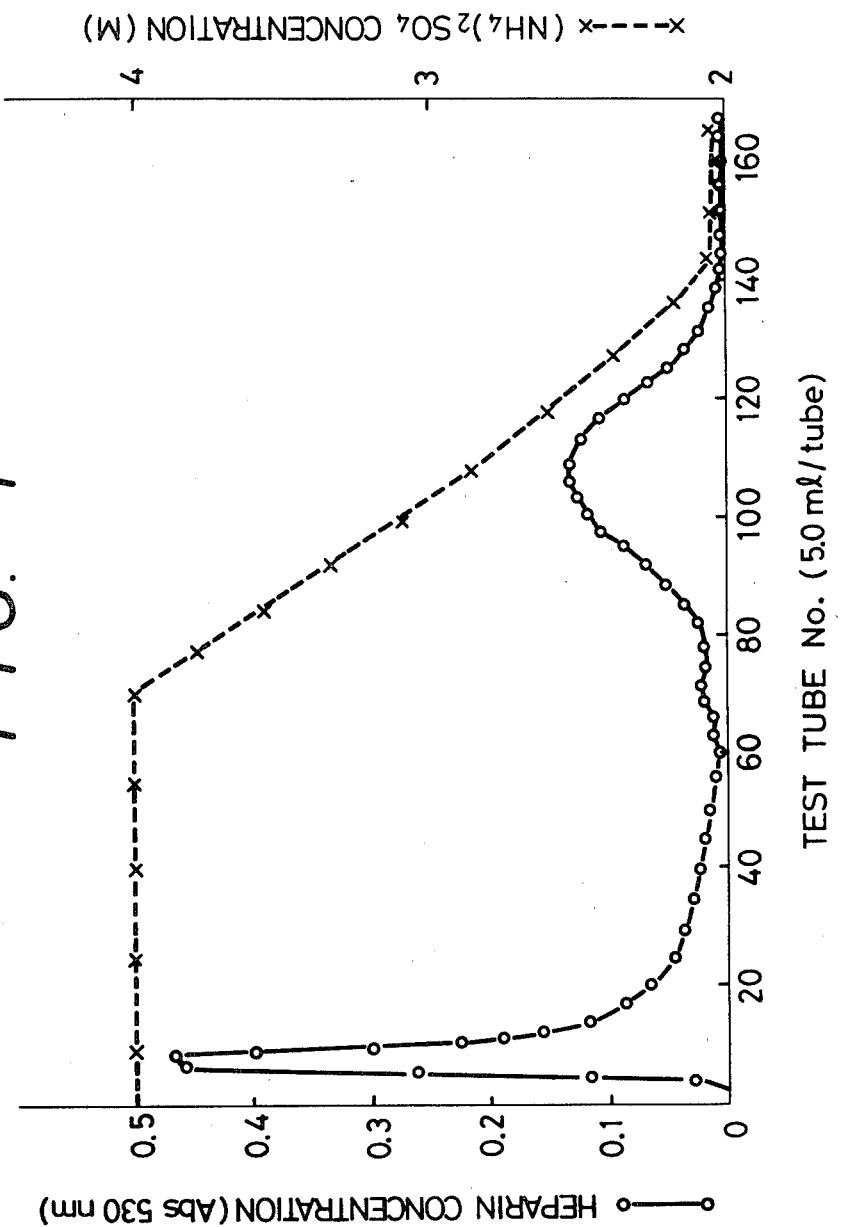

PROCESS FOR SEPARATION OF CARBOHYDRATES

This is a continuation, of application Ser. No. 292,679 filed Aug. 13, 1981, now abandoned.

This invention relates to a process for separation of carbohydrates. More particularly, it pertains to a process for separation of carbohydrates by use of hydrophobic interaction chromatography.

Hydrophobic interaction chromatography is a method for separation of solutions from each other according to the difference in interactions between the hydrophobic sites in solutes and the hydrophobic ligands possessed by the chromatographic support.

Most substances constituting living bodies exist in an aqueous medium. Some substances, typically proteins, have strongly hydrophobic sites (amino acid residues) on the molecular surface, and hence it is theoretically possible to effect separation by hydrophobic interaction chromatography according to the extent of hydrophobicity. In fact, there have been reported examples of separation of proteins by hydrophobic interaction chromatography based on this principle and a highly effective separation and purification of proteins has been performed by using it in combination with an ion-exchange chromatography or an affinity chromatography.

On the other hand, for separation and purification of carbohydrates, there have been adopted methods utilizing distribution into different solvents, ion-exchangeability, adsorptive property or affinity for specific substances or difference in molecular weights. Utilization of hydrophobic interaction chromatography, however, has entirely been disregarded and not attempted in the prior art at all. One reason may be due to the fact that carbohydrates have structures containing a large number of hydrophilic groups but very few hydrophobic groups, thus being very poor in hydrophobicity, and therefore application of hydrophobic interaction chromatography based in principle on hydrophobic interaction for carbohydrates has been deemed to be ineffective. There was also a situation that it was difficult to set conditions for adsorption and elution in hydrophobic interaction chromatography, even when proteins are to be separated. Under such a situation, application of hydrophobic interaction chromatography to saccharides would have never been dreamt of. To explain in more detail, some parameters such as isoelectric points of proteins in case of ion-exchange chromatography, or Km values of substrates or co-enzymes or affinity for inhibitors in case of affinity chromatography, can be useful in setting conditions. Whereas, in case of hydrophobic interaction chromatography, there have been known very little about the true nature of interaction between the hydrophobic sites in proteins and the hydrophobic ligands in chromatographic supports. For this reason, there existed a background that setting of conditions for adsorption and desorption had to be dependent on experimental trials.

In the course of studies made by the present inventors about the relationship between the structures and physiological activities of mucopolysaccharides, they have unexpectedly found that carbohydrates, especially mucopolysaccharides can effectively be separated and purified by hydrophobic interaction chromatography, and consequently accomplished the present invention. Even more surprising, it has also been found that mucopolysaccharides can be separated and fractionated into fractions having different physiological activities according to the separation process of the present invention.

That is, mucopolysaccharides are complex polysaccharides containing hexosamine and, uronic acid as constituent monosaccharides, which are widely distributed in animal tissues or body fluids. There exist a variety of mucopolysaccharides depending on the species of the constituent monosaccharides and the contents of substituents such as N-acetyl groups, O-sulfate groups, N-sulfate groups, etc., including heparin, heparan sulfate, dermatan sulfate, chondroitin sulfates A-H and others. Mucopolysaccharides are known to have specific functions for connective tissues as well as a number of physiological activities such as interaction with coagulating factors in blood and vessel wall, lipemia clearing action, participation in cell functions such as inhibition of cell proliferation, actions for platelet function, etc. For these mucopolysaccharides, since they have no region of hydrophobic interaction on the molecular surface as in proteins, it has generally been considered that no effective application of hydrophobic interaction chromatography can be expected thereto. On the contrary, according to the knowledge obtained by the present inventors, a mucopolysaccharide which has purified by a conventional means of the prior art, for example, heparin can be fractionated by hydrophobic interaction chromatography into fractions with different hydrophobicity. As a further surprising fact, there has also been found the novel fact that each fraction of the heparin has an anticoagulant activity with a potency corresponding to the strength of hydrophobicity. This fact means that it is possible to purify fractions of highly potent physiological activities from mucopolysaccharides such as heparin, thus promising a great contribution to the field of pharmaceuticals. No such separation of mucopolysaccharides into fractions with different potencies of physiological activity is possible by the methods for separation of carbohydrates of prior art, as mentioned above, but it has been accomplished for the first time by the present invention.

Thus, the object of the present invention is to provide a process for separation of carbohydrates, especially mucopolysaccharides, and further to provide a process for separation of mucopolysaccharides into fractions having different physiological activities.

The process for separation of carbohydrates according to the present invention is a process, which comprises conducting separation of carbohydrates by use of hydrophobic interaction chromatography.

Referring now to the support for hydrophobic interaction chromatography and hydrophobic ligands to be used in the present invention, the carbohydrate to which the present invention is applied may be a macromolecular polysaccharide, consisting of constituent monosaccharides such as hexosamine and uronic acid, said constituent saccharide having amino groups or hydroxyl groups bonded to acetyl groups or sulfate groups. The polysaccharide is an acidic polysaccharide having carboxyl groups and/or sulfate groups and therefore the support matrix structure for hydrophobic interaction chromatography should preferably have a macro-network structure having no ion-exchange capacity. Further, it is also desired that the substances constituting the skeleton of these supports should not possess excessive hydrophobicity. In view of these points, there is generally used a crosslinked agarose (particularly those crosslinked with epihalohydrin such as epichlorohydrin), polyvinyl alcohol resin, etc., but there may also be used other materials within the spirit of the present invention. Since the principle of hydrophobic interaction chromatography is based on utilization of mutual interaction between the hydrophobic sites of solutes and the hydrophobic ligands of the support, hydrophobic groups must be introduced appropriately into the support according to the properties of the solutes. For this purpose, it is required to select suitably the kind as well as the density of hydrophobic groups. When the solutes are poorly hydrophobic like mucopolysaccharides, the hydrophobic ligands in the chromatographic support should preferably exist under conditions under which mutual interaction may readily be effected through a spacer. As the types of ligands, there may suitably be used alkyl groups, preferably having 1 to 12 carbon atoms such as methyl, ethyl, butyl, hexyl, octyl and decyl; alkyl groups substituted with hydroxyl group, carboxyl group and/or amino group, such as 2,3-dihydroxypropyl group, $\omega$-amino-octyl group, $\omega$-amino-ethyl group, $\omega$-amino-decyl group; alkylene groups such as 2-hydroxy-1,3-propylene group; aryl groups such as phenyl group and nephthyl group; or aralkyl groups such as benzyl group and phenethyl group. These hydrophobic ligands may be introduced into the support by utilizing the hydroxyl groups contained therein, through the reaction using BrCN or the reaction with a glycidyl alkyl ether [see S. HJERTEN et al.: B.B.A. 412 (1975) 51–61, J. Chromatography 101 (1974) 281–288, S. SHALTIEL et al.: Pro. Nat. Acad. Sci. USA 70 (1973) 778–781]. As the factors determining the strength of hydrophobic interaction, the chain length of the carbon chain of the above ligand and the type of the substituents contained therein as well as the density of the ligands in the support are important, and they will affect greatly separation of solutes.

Commercial products for these supports are available under the trade names such as Octyl Agarose, Benzyl Agarose [Pierce Chemicals Inc., U.S.A.], Alkyl Agaroses, $\omega$-Aminoalkyl Agaroses [Miles Laboratories, Inc., U.S.A.], Phenyl-Sepharose CL-4B, Octyl-Sepharose CL-4B [Pharmacia Fine Chemical Co., Sweden]. The "Sepharoses" are the Pharmacia Fine Chemical Company's trademark for the corresponding agarose, e.g., phenyl agarose and octyl agarose.

As to the conditions for absorption and elution, it is obvious in principle that solutes will be bound onto the support ligands under the conditions affording strong hydrophobic interaction, while they will be eluted when hydrophobic interaction is weakened. As the factors affecting the strength of hydrophobic interaction, there are ionic strength, temperature, pH or polyvalent hydroxyl compounds, or surfactants. When ionic strength is high, hydrophilic groups (dissociable groups) tend to be non-dissociable, whereby hydrophobic interaction is stronger. On the contrary, hydrophobic interaction is weakened as the decrease of ionic strength. As for the influence by temperature, the interaction is weak at higher temperatures and stronger as the temperature is lowered. The process according to the present invention usually is carried out at a temperature of 0° to 50° C., preferably 0° to 25° C. Further, as a solvent which weakens hydrophobic interaction between solutes and support ligands, there may be used a solvent or a substance which is competitive with hydrophobic interaction between support ligands and solutes. Usually, there may be employed alcohols such as methanol, ethanol, propanol, butanol or ethyleneglycol, compounds having hydrophilic moiety and hydrophobic moiety in the molecule such as surfactants or the compounds known to have a function to weaken hydrophobic interaction such as urea, guanidine, tetraethyl-ammonium salts, ammonium sulfide, etc.

By selecting and controlling these various factors, hydrophobic interaction between solutes and hydrophobic ligands in chromatographic support can be controlled, whereby adsorption and desorption may be effected according to the extent of hydrophobicity of solutes. Usually, carbohydrates are retained on the support under the condition of the strongest hydrophobic interaction, and then brought to a weaker condition in order to permit a fraction with lower hydrophobicity to be eluted. By repetition of this procedure, it is possible to elute fractions successively in the order of fractions with weaker hydrophobicity until finally the most hydrophobic fraction is separated and eluted.

The present invention is illustrated with reference to the following Examples.

Example 1

Separation of heparin by the stepwise elution method on Phenyl-Sepharose CL-4B (column)

Commercial hog-mucosal heparin (Sigma Chemical Co.) 161 USP units/mg. (USP unit: anticoagulant activity assayed by the method of the United States Pharmacopoeia) was purified to have a more homogeneous molecular size distribution by the gel-filtration method on Sephadex G-100 according to the procedure of Laurent et al. [T. C. Laurent et al.: Biochem. J. 175 (1978) 691–701]. Using the so purified heparin 179 USP units/mg. as the starting heparin, adsorption and elution were performed by hydrophobic interaction chromatography according to the procedures (1) to (7) shown below through a column of Phenyl-Sepharose CL-4B and heparin in each fraction was isolated as sodium salt powders according to conventional procedure. Analytical values and yields of heparins isolated from respective fractions are shown in Table I.

(1) Phenyl-Sepharose CL-4B column (210×4.5 cm. I.D. is conditioned with 3.8 M $(NH_4)_2SO_4$/0.01 M HCl (pH 3.3);
(2) The purified heparin 10 g. is dissolved in 2-liter of a solvent [3.8 M $(NH_4)_2SO_4$/0.01 M HCl (pH 3.3)] to be ready for use;
(3) The purified heparin solution is loaded on the Phenyl-Sepharose CL-4B column to have heparin adsorbed onto the support;
(4) Washing elution is performed with 22.5-liter of a washing solution 3.8 M $(NH_4)_2SO_4$/0.01 M HCl (pH 3.3)] at a flow-rate of 500 ml/hr;
(5) Elution is performed similarly with 15-liter of 3.4 M $(NH_4)_2SO_4$/0.01 M HCl (pH 3.35);
(6) Elution is performed similarly with 13.8-liter of 3.0 M $(NH_4)_2SO_4$/0.01 M HCl (pH 3.4);
(7) Elution is performed similarly with 5-liter of 2.0 M $(NH_4)_2SO_4$/0.01 M HCl (pH 3.5).

These chromatographic operations were conducted in a room controlled at a temperature of 18° to 22° C.

TABLE I

| Fraction | Yield (g.) | Anticoagulant activity (USP units/mg.) | *Fraction size by affinity-chromatography on antithrombin III-Sepharose (%) | | |
|---|---|---|---|---|---|
| | | | NA | LA | HA |
| 3.8 M | 3.845 | 100 | 37.8 | 38.7 | 24.0 |
| 3.4 M | 2.593 | 214 | 1.0 | 45.7 | 53.8 |
| 3.0 M | 1.658 | 254 | 0.4 | 26.3 | 73.3 |
| 2.0 M | 0.488 | 210 | 5.4 | 21.1 | 73.5 |

*Fraction size by affinity-chromatography on antithrombin III-Sepharose was determined by coupling the purified bovine antithrombin III prepared as described by Damus and Rosenberg [Methods Enzymol. 45B, 653–669 (1976)] to BrCN-activated Sepharose 4B according to the procedure of Cuatrecasas [J. Biol. Chem. 245 (1970) 3059–3065], packing the coupled product in a column, practicing affinity-chromatography of the hydrophobic chromatography fractions on antithrombin III-Sepharose column to separate into non-adsorbed (NA), low-affinity (LA) and high-affinity (HA) fractions according to the method of Laurent et al. [Biochem. J., 175 (1978) 691–701], and indicating the relative content of uronic acid in percent.

EXAMPLE 2

Separation of heparin by the reversed liner gradient elution method on Octyl-Sepharose CL-4B (column)

Octyl-Sepharose CL-4B was conditioned with 4.0 M $(NH_4)_2SO_4$/0.01 M HCl (pH 2.9) and packed in a 40×0.7 cm. I.D. column.

The commercial hog-mucosal heparin (60 mg., 161 USP units/mg.) dissolved in 15 ml of 4.0 M $(NH_4)_2SO_4$/0.01 M HCl, pH 2.9, was loaded on the Octyl-Sepharose CL-4B column. The column was washed with 350 ml of the same solution and then was eluted with a reversed linear gradient comprising 4.0 M–2.0 M $(NH_4)_2SO_4$ in 0.01 M HCl (400 ml) to obtain the chromatogram as shown in the accompanying drawing (FIG. 1). In the drawing, heparin concentration in each test tube is shown in terms of absorbance at 530 nm. of 20 μl. sample colored by the carbazole reaction.

The test tube numbers 3 to 73 were pooled as fraction 1 and those 74 to 140 as fraction 2, and the heparin in each fraction was isolated as powdery Na salt according to a conventional method. Recovery, yield and anticoagulant activity are given in Table II.

TABLE II

| Fraction | Test tube No. | Yield mg. (Recovery %) | Anticoagulant activity (USP units/mg.) |
|---|---|---|---|
| 1 | 3–73 | 29.70 (49.5) | 95 |
| 2 | 74–140 | 30.18 (50.3) | 225 |

EXAMPLE 3

Fractionation of commercial heparin by the stepwise method on Benzyl-Agarose column Hydrophobic interaction chromatography was performed according to the following procedures (1) to (8) for commercial hog-mucosal heparin (Sigma Chemical Co., 161 USP units/mg.), using Benzyl-Agarose (Pierce Chemical Co., U.S.A.) column. The heparin in each fraction was isolated as powdery sodium salt according to a conventional method. Yield and anticoagulant activity for each heparin isolated from each fraction are given in Table III.

(1) Benzyl-Agarose column (215×4.5 cm. I.D.) was pre-conditioned with 3.8 M $(NH_4)_2SO_4$/0.01 M HCl (pH 3.3). The following operations (2) to (8) were conducted at room temperature (18°–22° C.);

(2) Heparin (10 g.) is dissolved in 2-liter of 3.8 M $(NH_4)_2SO_4$/0.01 M HCl (pH 3.3) to prepare a heparin solution;

(3) The heparin solution is loaded on the Benzyl-Agarose column to have heparin adsorbed onto the support;

(4) Through the column is flowed 35-liter of 3.8 M $(NH_4)_2SO_4$/0.01 M HCl (pH 3.3) to effect elution (flow-rate: 500 ml/hr.);

(5) Through the column is flowed 28-liter of 3.4 M $(NH_4)_2SO_4$/0.01 M HCl (pH 3.35);

(6) Through the column is flowed 28-liter of 3.0 M $(NH_4)_2SO_4$/0.01 M HCl (pH 3.4);

(7) Through the column is flowed 10.5-liter of 2.5 M $(NH_4)_2SO_4$/0.01 M HCl (pH 3.45);

(8) Through the column is flowed 14-liter of 2.0 M $(NH_4)_2SO_4$/0.01 M HCl (pH 3.5).

TABLE III

| Eluted Fraction | Yield (g.) | Anticoagulant activity (USP units/mg.) |
|---|---|---|
| 3.8 M | 3.04 | 75.5 |
| 3.4 M | 2.52 | 182.1 |
| 3.0 M | 2.38 | 237.8 |
| 2.5 M | 0.50 | 248.5 |
| 2.0 M | 0.08 | 0 |

As apparently seen from Examples 2 and 3, the heparin used in these Examples consists of two components having significantly different anticoagulant activities, which can be fractionated corresponding to the strength of hydrophobicity.

EXAMPLE 4

Comparison between fractionations depending on the hydrophobic ligands

Stepwise hydrophobic interaction chromatography of 5.01 mg. of commercial hog-mucosal heparin (Sigma Chemical Co., 161 USP units/mg.) was conducted each through a 6×0.6 cm. I.D. column of Octyl-Sepharose CL-4B, Phenyl-Sepharose CL-4B (Pharmacia Fine Chemicals, Sweden) and Benzyl-Agarose (Pierce Chemical Co., U.S.A.) for the purpose of comparison between the influences by the difference of ligands. Adsorption and elution were carried out similarly as in Example 3 and the relative content percentages of heparin in the fractions at respective ammonium sulfate concentrations were compared. The results are given in Table IV.

TABLE IV

| Support | Ammonium sulfate fraction | | | | |
|---|---|---|---|---|---|
| | 3.8 M | 3.4 M | 3.0 M | 2.5 M | 2.0 M |
| Octyl-Sepharose CL-4B | 76 | 17.4 | 6.6 | 0 | 0 |
| Phenyl-Sepharose CL-4B | 70.0 | 17.8 | 10.3 | 1.2 | 0.7 |
| Benzyl-Agarose | 35.7 | 29.7 | 28.1 | 5.8 | 0.7 |

Example 4 clearly shows that there are changes in fraction size percentages of heparin with the difference in hydrophobic ligands in the support, indicating increased binding force of heparin as the increase of hydrophobicity in the order of octyl group, phenyl group and benzyl group.

EXAMPLE 5

TABLE V

| Mucopoly-saccharide | Hydro-phobic gel* | Amount of sample loaded (mg.) | Mucopolysaccharide content in chromatographic fractions (%) | | | | | | |
|---|---|---|---|---|---|---|---|---|---|
| | | | 3.8 M** | 3.4 M | 3.0 M | 2.5 M | 2.0 M | 1.5 M | 1.0 M |
| Chondroitin-6- | Octyl-S | 5.05 | — | 0.9 | 2.0 | 25.3 | 62.3 | 9.5 | 0 |
| sulfate | Phenyl-S | 5.18 | — | 0 | 0 | 1.9 | 67.6 | 29.9 | 0.6 |
| Chondroitin-4- | Octyl-S | 5.03 | 37.3 | 31.4 | 7.7 | 21.0 | 2.6 | 0 | 0 |
| sulfate | Phenyl-S | 5.05 | 2.3 | 6.2 | 18.8 | 48.1 | 23.6 | — | 1.0 |
| Dermatan | Octyl-S | 5.03 | — | — | — | 94.5 | 4.1 | 1.1 | 0.3 |
| sulfate*** | Phenyl-S | 5.05 | — | — | — | 78.1 | 13.2 | 3.2 | 2.7 |
| Keratan | Octyl-S | 3.09 | — | — | 37.2 | 40.8 | 21.2 | 0.8 | 0 |
| sulfate | Phenyl-S | 4.05 | — | — | 15.9 | 23.4 | 40.9 | 19.3 | 0.2 |
| Hyaluronic | Octyl-S | 5.09 | — | — | 58.6 | 4.1 | 27.5 | 7.4 | 1.3 |
| acid | Phenyl-S | 5.08 | — | — | 22.3 | 8.0 | 17.0 | 44.4 | 4.9 |
| Chondroitin polysulfate | Phenyl-S | 5.10 | 0.8 | 7.6 | 28.1 | 34.5 | 16.3 | 11.8 | 1.1 |
| Heparan | Octyl-S | 4.79 | 20.8 | 20.2 | 19.7 | 18.3 | 18.2 | 1.5 | 1.5 |
| sulfate**** | Phenyl-S | 4.95 | 9.1 | 10.1 | 18.9 | 44.9 | 17.0 | — | 2.7 |

*Octyl-S: Octyl-Sepharose CL-4B
Phenyl-S: Phenyl-Sepharose CL-4B
**Ammonium sulfate concentration in eluent.
***Dermatan sulfate found in hog skin.
****Heparan sulfate found in bovine kidney (1.25 M NaCl fraction on Dowex-1(Cl⁻) column).

Comparison between fractionations of various mucopolysaccharides using Octyl-Sepharose CL-4B, and Phenyl-Sepharose CL-4B Octyl Sepharose CL-4B and Phenyl-Sepharose CL-4B column (6×0.6 cm. I.D., respectively), were prepared, and previously equilibrated with an ammonium sulfate solution which was used to dissolve various mucopolysaccharides to be loaded. Through each column, a various kinds of mucopolysaccharides were loaded to be adsorbed thereon, followed successively by stepwise elutions using ammonium sulfate solutions at various concentrations. The mucopolysaccharides in the resultant fractions were precipitated with cetylpyridinium chloride, followed by conversion to Na salts with NaCl, precipitated with alcohol, dried to powders and weighed. The weight of the mucopolysaccharide recovered in each of these fractions was represented in terms of the percentage (%) in total amount of recovered mucopolysaccharides and shown in Table V.

As apparently seen from Table V, when various mucopolysaccharides are chromatographed on the supports with different hydrophobicity, mucopolysaccharides are separated, respectively, corresponding to the difference in hydrophobic interaction with the hydrophobic ligands.

EXAMPLE 6

Effects of various kinds of gels (supports) upon separation of heparin

In order to investigate the effects of hydrophobic ligands in the chromatographic supports, various kinds of gels (supports) were used, as shown in Table VI. The conditions under which heparin was separated into fractions are as follows:

(1) Column size: 6.0×0.6 cm. I.D. (1.7 ml)
(2) Temperature: at room temperature (21° to 25° C.)
(3) Volume of each fraction: 30 ml/fraction
(4) Flow-rate of element: 15 ml/hr.

The results are shown in the following Table VI.

TABLE VI

| Hydrophobic gel | Heparin applied (mg.) | Recovery (%) | Heparin eluted (% to applied amount) (NH₄)₂SO₄/0.01 M HCl (M) | | | | | Adsorbed heparin (3.4–2.0 M) Recovery % |
|---|---|---|---|---|---|---|---|---|
| | | | 3.8 | 3.4 | 3.0 | 2.5 | 2.0 | |
| Sepharose 4B | 5.1 | 94 | 90.0 | 0.5 | 0.5 | 0.8 | 1.2 | 3 |
| Sepharose CL-4B | 5.1 | 102 | 84.6 | 12.3 | 3.9 | 0.8 | 0 | 17 |
| Phenyl-Sepharose CL-4B | 5.1 | 94 | 57.8 | 30.9 | 4.1 | 0.4 | 0.7 | 38 |
| Octyl-Sepharose CL-4B | 5.1 | 91 | 62.4 | 18.9 | 6.9 | 1.1 | 1.6 | 31 |
| Benzyl-Agarose (Pierce) | 5.1 | 94 | 34.6 | 29.9 | 24.4 | 3.9 | 0.8 | 63 |
| Octyl-Agarose (Pierce) | 5.1 | 100 | 43.8 | 36.2 | 17.7 | 1.8 | 0.8 | 57 |
| Octyl-Agarose (MILES) | 5.1 | 101 | 36.5 | 27.6 | 23.4 | 12.0 | 1.8 | 64 |
| ω-amino-Octyl-Agarose (MILES) | 5.1 | 100 | 31.0 | 24.3 | 23.0 | 16.6 | 4.2 | 68 |

EXAMPLE 7

Separation of heparin on Alkyl-Agarose gels different alkyl chain length

In order to examine the effect on separation of heparin depending upon the chain length in Alkyl-Agarose, experiments were conducted in the same manner as in Example 6 except that the amount of applied heparin was 3.0 mg. and that column size was 1.3×2.7 cm. I.D. (1.0 ml).

The results are shown in Table VII.

TABLE VII

| Hydrophobic chromatography kit | Heparin applied (mg.) | Recovery (%) | Heparin eluted (% to applied amount) (NH$_4$)$_2$SO$_4$/0.01 M HCl (M) | | | | | |
|---|---|---|---|---|---|---|---|---|
| | | | 3.8 | 3.4 | 3.0 | 2.5 | 2.0 | 1.0 |
| Agarose C$_0$ | 3.0 | 97 | 90.8 | 3.6 | 0.8 | 0.06 | 1.3 | 0.3 |
| Ethyl-Agarose C$_2$ | 3.0 | 100 | 37.5 | 14.9 | 20.3 | 20.3 | 6.2 | 0.9 |
| Butyl-Agarose C$_4$ | 3.0 | 103 | 28.0 | 16.2 | 25.4 | 25.2 | 7.1 | 1.6 |
| Hexyl-Agarose C$_6$ | 3.0 | 99 | 28.1 | 16.6 | 23.9 | 22.9 | 6.5 | 0.6 |
| Octyl-Agarose C$_8$ | 3.0 | 110 | 29.6 | 15.9 | 28.5 | 27.7 | 7.3 | 0.7 |
| Decyl-Agarose C$_{10}$ | 3.0 | 105 | 50.6 | 22.9 | 19.0 | 11.6 | 1.0 | 0 |

(Hydrophobic Chromatography Kits available from Miles were used)

We claim:

1. A process for separation of mucopolysaccharides which comprises separating a mucopolysaccharide into its constituent components comprising contacting said mucopolysaccharide with a chromatographic column comprising a support selected from the group consisting of crosslinked agarose, non-cross-linked agarose, and a polyvinyl alcohol, said support containing hydrophobic ligands selected from the group consisting of alkyl groups; alkyl groups substituted with at least one group selected from the group consisting of a hydroxyl group, a carboxyl group and an amino group; alkylene groups substituted with a hydroxyl group; aryl groups; and alalkyl groups, and thereby separating said mucopolysaccharide into its constituent components.

2. The process according to claim 1, wherein the mucopolysaccharides are heparin, haparan sulfate, chondroitin sulfates, dermatan sulfate, hyaluronic acid, keratan sulfate, or chondroitin-polysulfates.

3. The process according to claim 1, wherein the alkyl group has 1 to 12 carbon atoms; the aryl group is a phenyl group or a naphthyl group; and the aralkyl group is a benzyl group or a phenethyl group.

4. The process according to any one of claims 2, 3, or 1, wherein the chromatographic support is selected from the group consisting of a crosslinked agarose, a phenyl agarose, an octyl agarose, a benzyl agarose, an ω-aminooctyl agarose, an ethyl agarose, a butyl agarose, a hexyl agarose and a decyl agarose.

5. The process according to claim 2, 3, or 1, wherein the mucopolysaccharide is heparin.

6. The process according to claim 2, 3 or 1, wherein the hydrophobic chromatography is carried out at a temperature of 0° to 50° C.

7. The process according to claim 6, wherein the hydrophobic chromatography is carried out at a temperature of 0° to 25° C.

8. The process according to claim 4, wherein said mucopolysaccharide is heparin.

9. The process according to claim 6, wherein said mucopolysaccharide is heparin.

10. The process according to claim 4, wherein the hydrophobic chromatography is carried out at a temperature of 0° to 25° C.

11. The process according to claim 8, wherein the hydrophobic chromatography is carried out at a temperature of 0° to 25° C.

12. The process according to claim 9, wherein the hydrophobic chromatography is carried out at a temperature of 0° to 25° C.

* * * * *